April 8, 1969    F. M. HAGMANN    3,437,726
METHOD OF IMPACT FORMING PLASTIC SHEET MATERIAL
Original Filed Dec. 2, 1965

INVENTOR.
FOSTER M. HAGMANN
BY Fulwider, Patton, Rieber
Lee, and Utecht
ATTORNEYS

United States Patent Office 3,437,726
Patented Apr. 8, 1969

3,437,726
METHOD OF IMPACT FORMING PLASTIC SHEET MATERIAL
Foster M. Hagmann, 130 N. Bristol,
Los Angeles, Calif. 90049
Continuation of application Ser. No. 511,586, Dec. 2, 1965. This application Jan. 29, 1968, Ser. No. 701,477
Int. Cl. B29c 3/00
U.S. Cl. 264—323                                3 Claims

ABSTRACT OF THE DISCLOSURE

Method for impact forming a relatively narrow projection of concavo-convex cross section in plastic sheet material. Plastic sheet material at ambient temperature is positioned between a pair of dies, one of which has a projection-forming recess and the other has a flat sheet-engaging surface, and they are brought into contact with the sheet material with a high impact, compressive force. The projection is free-formed within the recess into a concavo-convex configuration due to the lateral extrusion of the plastic material beyond its elastic limit. Means are provided on one die member for restraining the outward lateral extrusion of the plastic material away from the recess.

CROSS REFERENCE TO RELATED APPLICATION

This application is a continuation of abandoned application Ser. No. 511,586, filed on Dec. 2, 1965, and entitled, "Method of and Apparatus for Impact Forming Plastic Sheet Material."

This application relates to forming or shaping plastics and more particularly to a method for impact forming plastics.

It is to be noted at the outset that the invention is concerned specifically with the shaping of plastics to provide projecting ridges and the like which are relatively narrow in cross section and which rise substantially with respect to the original thickness of the material. In this significant respect, it differs from conventional techniques, such as embossing, that deal with indenting or scoring the surface of the material.

By way of example, the method of the invention finds useful application in the sealing field in the mass production of high quality sealing-lining elements from plastic sheet material. Such elements are used in cooperative association with a grooved cap or other retaining member in the manner disclosed in U.S. Patent No. 3,122,253, entitled, Seal, and in U.S. Patent No. 3,122,255, entitled, Sealing Closure. It is desirable in order to accomplish high-pressure sealing that such an element have a continuous ridge of relatively narrow cross section, so as to exert a high unit pressure in the region of contact with the part to be sealed. Forming a ridge with a relatively high rise, on the other hand, enables the element to effectively accommodate large out-of-flat tolerances in the part to be sealed.

Certain thermoplastics, such as polyethylene, have many desirable sealing properties. They are resilient, deformable and substantially incompressible. In addition, they are non-corrosive and non-contaminating, as well as impervious to most all substances.

Characteristic of such thermoplastics that lend themselves to use in the sealing field, is that they extrude or cold flow, i.e., deform beyond the elastic limit, when subjected to force in an unconfined state. Following such extrusion or cold flow, the material, of course, takes on a new shape. Significantly, even after having been subjected to this shaping, the material retains its desirable physical properties.

Another significant characteristic of thermoplastics of the subject type is that they soften when heated. Heat thus serves to enhance extrusion. Moreover, such heating and subsequent cooling and rehardening do not adversely affect the desirable sealing properties.

It has been found that when plastic material of the type described is subjected to a high impact, compressive force, the energy imparted to the material is dissipated as deformation of the material and as heat. With respect to the deformation, part is elasic deformaion and part is extrusion which may be employed in shaping the material. The heat generated, in turn, softens the material and, as set forth above, enhances the shaping process. Thus, where forming or shaping is to be accomplished, it is advantageous to suddenly apply a force as opposed to gradually applying a force of the same magnitude.

Use of correspondingly shaped male and female dies in impact forming plastics has proven to be totally unsatisfactory. Where attempts are made to form projections and the like of relatively narrow cross-section, the plastic cannot be forced into the female die cavity. Rather, the male die tears or fractures the material, particularly where relatively thin sheet material is being formed. Even if such tearing or fracture are avoided, the desired shapes still cannot be attained.

In view of the foregoing, it is a primary object of this invention to provide a method for effectively impact forming plastics.

It is a further object to provide an improved method readily adapted for economically mass producing specially shaped plastic parts.

Another more specific object is to provide such a method especially adapted for forming plastic sheet material with projections and the like which are relatively narrow in cross section and which rise substantially in relation to the original thickness of the material.

A further object is to provide such a method characterized in that the plastic parts produced are uniformly of high quality.

These and other objects, features, and advantages of the invention will be better understood by referring to the following detailed description taken in conjunction with the accompanying drawing, in which.

Figure 1:
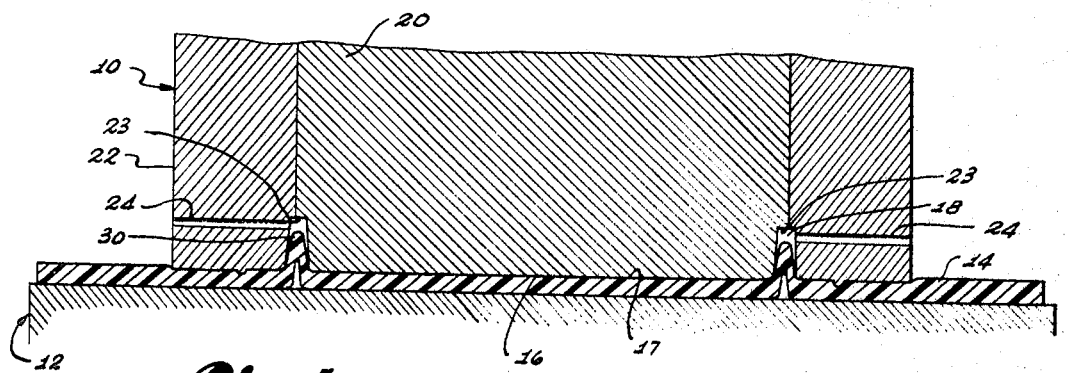
FIGURE 1 is a vertical sectional view of apparatus suitable for carrying out the method of the invention, the various parts being shown in conjunction with a strip of plastic sheet material being formed in the relative positions occupied at the completion of the forming operation.
Figures 3, 4:
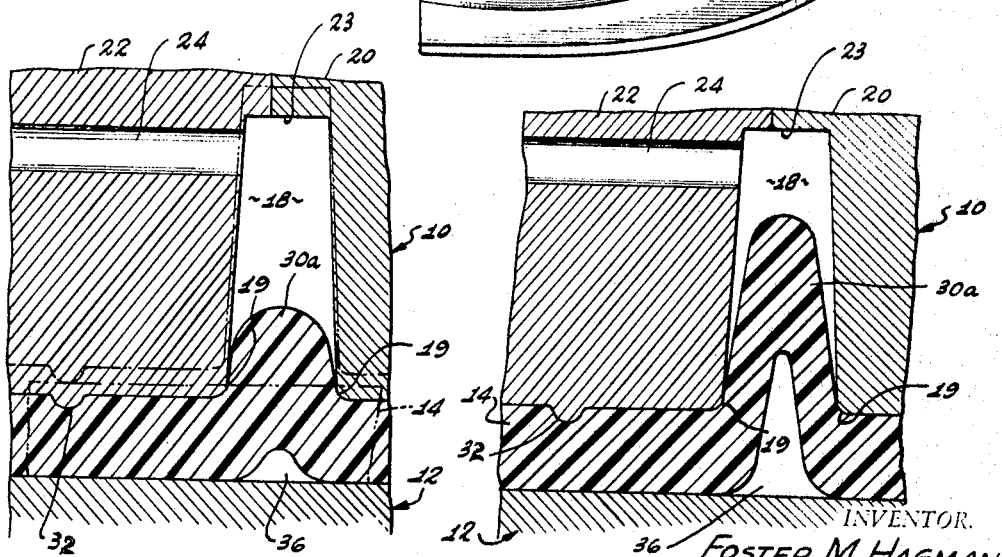

FIGURE 3 is a fragmentary sectional view on an enlarged scale of the portion of the apparatus of FIGURE 1 at the left-hand side thereof and showing the parts in the relative positions occupied and the configuration of the sheet material at an intermediate stage of the forming operation; and FIGURE 4 is a view similar to FIGURE 3, except that the parts of the apparatus and the configuration of the sheet material are shown at completion of the forming operation, as in FIGURE 1.

Referring to the drawing, FIGURE 1 shows apparatus constructed in accordance with the invention and suitable for carrying out the method of the invention. The apparatus comprises a first or upper die member 10, a second or lower die member 12 and means (not shown), such as a conventional mechanical press, for effecting relative movement of the members 10 and 12 toward and away from one another. These die members 10 and 12 cooperate during such movement toward one another to exert a high impact, compressive force of large magnitude to a strip 14 of suitable plastic sheet material in a direction normal thereto to form or shape it.

The upper die member 10 is generally cylindrical in shape and has a configured sheet-engaging surface 16 at its lower end. On the other hand, the lower die member comprises a plate or the like with a flat sheet-engaging surface 17.

A recess or cavity 18 which is relatively narrow in width as compared to its depth extends upwardly into the upper die member 10 from the surface 16. For convenience of manufacture, particularly as regards the provision of the recess 18, the upper die member 10 is formed in two pieces. These include an inner cylindrically shaped bar 20 and an outer collar 22 press fit on the bar. Portions of the recess 18 may conveniently be cut in the adjacent surfaces of the parts before the parts are assembled. It is desirable to round slightly the corners 19 (FIGURES 3 and 4) at the junctures of the side walls of the recess 18 with the surface to avoid any shearing action on the material of the strip 14 as it flows into the recess.

Preferably, in order to obtain optimum results, the width of the recess 18, at least adjacent its mouth, is approximately equal to the thickness of the strip 14 of sheet material to be formed. It is also preferred, though not essential, that the recess 18 taper slightly in width from a maximum adjacent its mouth to its minimum adjacent its end wall 23. Such a tapered configuration facilitates removal of the element formed from the die member 10. The depth of the recess 18, on the other hand, is sufficiently great that no portion of the element being formed contacts the end wall 23 at any stage of the forming operation.

Extending radially outwardly from the recess 18 at a location adjacent its end wall 23 are vent passages 24. Two such passages 24 are provided in the present case at diametrically opposed positions. They serve to vent air from the recess 18 that otherwise would be trapped and compressed therein during the forming process.

Figure 2:
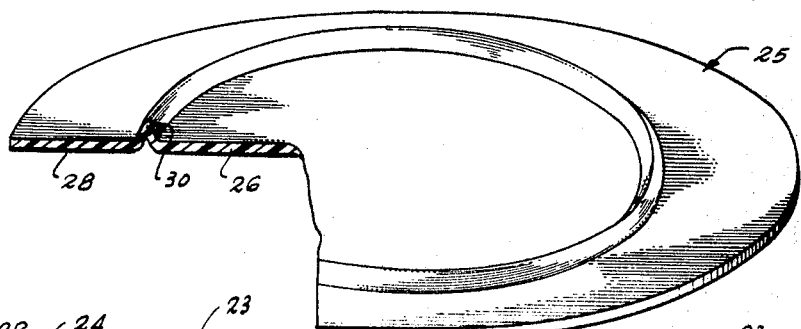
FIGURE 2 is a fragmentary perspective view of a plastic sealing-lining element formed in accordance with the method of the invention.

The sealing-lining element 25, illustrated in FIGURE 2, comprises a typical part formed in accordance with the method of the invention by the illustrated apparatus. As suggested above, the element is formed of a thermoplastic with good sealing properties; preferably polyethylene. Thus, the strip 14 may be considered to comprise an elongated flat sheet of polyethylene.

The final element 25 has substantially coplanar inner and outer liner sections 26 and 28 with a continuous annular bead 30 between them. In cross section, the bead 30 is concavo-convex in shape with a narrow width and a substantial rise in relation to the original thickness of the material. The rise is, in fact, greater than the original thickness of the material. At the junctures of the bead 30 with the respective liner sections 26 and 28, the wall thickness of the material is relatively thin. This is advantageous from a sealing standpoint as it enables the bead 30 to flex vertically even though the material itself may be relatively stiff.

It is observed that, while the recess 18 in the die member 10 does not serve to establish the cross-sectional shape of the bead 30 on the element 25, it does serve to locate the bead and establish its maximum width, as well as to establish its overall configuration. Since the desired bead 30 here is annular, the recess 18 in the die member 10 is likewise annular. In this connection, it will, of course, be understood that the overall shape of the recess 18 is made to correspond to the desired shape of the bead or similar projection to be formed.

Projecting downwardly from the upper die member 10 at a location spaced radially outwardly of the recess 18 is a ridge 32. As may be seen in FIGURE 3, the ridge 32 is relatively shallow in relation to the thickness of the strip 14 of sheet material and is continuous about the entire recess 18. Its purpose is to engage the underlying portion of the strip 14 and tend to restrain outward extrusion or flow of the plastic material from within the confines of the ridge, outwardly thereof. This is achieved by virtue of the ridge pressing into the material of the strip to exert a unit pressure in the region of contact which is high in relation to the unit pressure either inwardly or outwardly thereof. Thus, the ridge 32 may be thought of as a dam for restraining outward flow of material.

The means for actuating the die members 10 and 12 in the forming operation may advantageously comprise a conventional mechanical press, as set forth above. In such case, the lower die member 12 may be fixed to the bed of the press, while the upper member 10 is secured to the movable portion thereof. Satisfactory results have been achieved with a 5-ton press when the diameter of the upper die member 10 is on the order of one inch. An important operational characteristic of such means is that it operate to move the die member 10 in such a manner that a high impact compressive force of large magnitude is exerted. The force must be suddenly, as opposed to gradually applied. Stated another way, the momentum of the die member 10 must be high at the instant of impact with the strip 14 of sheet material.

In carrying out the method of the invention, the flat strip 14 is first positioned between the surfaces 16 and 17 of the respective die members 10 and 12. The means for actuating the die members is then operated to effect relative movement of them toward one another. As emphasized above, the members 10 and 12 are moved in such a manner that a high impact, compressive force of large magnitude is applied to the strip 14 in a direction normal to it.

In the illustrative case, initial contact of the upper member 10 with the strip 14 is made, as may be seen in phantom lines in FIGURE 3, when the ridge 32 presses or bites into the material. Thereafter, the surface 16 strikes the strip 14 and begins imparting energy to it which as noted above, is dissipated as deformation and heat. Since a compressive force is being applied, the strip 14 flattens slightly and corresponding lateral extrusion or flow of the material occurs, as in FIGURE 3. The heat generated, in turn, softens the material of the strip and enhances the extrusion or flow.

It is significant to note at this stage that plastic materials, such as polyethylene, are substantially incompressible. Thus, flattening or thinning of the strip 14 necessarily results in lateral extrusion or flow.

Referring again to FIGURE 3, the recess 18 affords a relatively low-resistance path for the laterally flowing material. Accordingly, material flowed outwardly from beneath the central portion of the member 10 commences movement into the recess 18. In addition, some inward flow of the material to the recess 18 from the annular portion of the strip located between the ridge 32 and the recess 18 is likely to occur. Outward flow of material beyond the ridge 32 from within the confines thereof is restrained by virtue of the high pressure exerted in that limited region.

Flow into the recess 18 results in a concavo-convex projection 30a, which eventually comprises the bead 30, starting to form. It is to be noted that the projection 30a contacts the side walls of the recess 18 adjacent its mouth, but is spaced slightly away from those walls thereabove. On the lower side of the strip 14, a concave cavity or depression 36 simultaneously forms. At this early stage of the forming process, the cavity 36 is somewhat smaller in cross section than the corresponding projection 30a on the opposite side of the strip.

Since a high impact, compressive force is applied to the strip 14 by the die members 10 and 12, a layer of air may, in some cases, be trapped between the sheet-engaging surfaces 16 and 17 of the die members and the adjacent surfaces of the strip. On the upper side of the strip 14 such air may pass into the recess 18 from which it is vented to the atmosphere through the passages 24, along with air that might otherwise be trapped in the recess itself 18. Regarding the lower side of the strip 14, experience indicates that at least some of the trapped air passes into the cavity 36 to aid in forcing the material of the strip into the recess.

Further deformation of the strip 14 results in the projection 30a rising toward its final condition of FIGURE 4. Once the projection has initially taken on a concavo-convex shape, as in FIGURE 3, the resistance to flow of material into the recess 18 decreases somewhat. Moreover, the effect of heat produced by the impact has a more pronounced effect on softening the material and enhancing flow after the forming process has progressed beyond initial stage. Thus, for these reasons, the shaping of the projection 30a from the condition of FIGURE 3 toward the final condition of FIGURE 4 takes place quite rapidly. In fact, the forming proceeds with such rapidity that it is believed that even with the vent passages 24 some back pressure develops in the void space of the recess and, to a degree, aids in shaping the projection. Control of this back pressure can be achieved by varying the size and number of vent passages 24. Alternately, the recess 18 can be made sufficiently large in volume that the back pressure is limited to a desired maximum.

The forming process in a sense is a free forming one. That is, although the recess 18 serves to establish the location of the projection 30a and to establish its maximum width in cross section, it does not dictate its shape. As is apparent in FIGURE 4, the projection 30a is spaced from adjacent side walls of the recess 18, except for limited areas adjacent the mouth of the recess. The shape of the projection 30a is governed by the chemical and physical composition of the material forming the strip and the nature of the impact force applied in the forming operation.

In view of the foregoing, it will be appreciated that the method of the invention and the illustrated apparatus for performing it are readily adapted for the production of uniformly high quality parts. Provided the material forming the strip 14 is of uniform physical and chemical composition, and that the means actuating the die member operates the same way in each forming operation, uniformity is assured.

It will, of course, be understood that the high impact, compressive force applied to achieve the desired forming is delivered in a single stroke of a press or other means for actuating the die members 10 and 12. In a mass production operation, the strip is supplied from a continuous roll or the like. Assuming this is the case, it is simply advanced following a given stroke to position it for the forming of the next part.

Once the bead 30 is fully formed, the die members 10 and 12 are separated and the bead 30 is freed from the recess 18. Following formation in the manner described, it will be understood that the outer liner section 28 of the element 25 is still integral with the strip 14. Removal can be quickly and easily accomplished by a conventional stamping operation. If so desired, such stamping may be accomplished at the same time as the forming.

While the method of the invention and apparatus suitable for carrying it out have been illustrated and described in considerable detail, it will be understood that this was only by way of illustration, and that various changes may be made without departing from the spirit and scope of the invention. It is also noted that, while the invention has been described as applicable to forming products for use in the sealing field, it has broader application.

I claim:

1. A method of impact forming flat plastic sheet material into an integral, configurated element having a relatively narrow bead with a concavo-convex cross-section projecting therefrom a distance greater than the thickness of said material, including the steps of:

positioning said sheet material at a substantially ambient temperature between a die member having a bead-forming recess in its sheet-engaging surface of a width adjacent its mouth that is relatively narrow in relation to its depth, and a back-up member having a substantially flat sheet-engaging surface;

applying a high impact, compressive force of large magnitude to said sheet material at said substantially ambient temperature to free form said bead within said recess, said force being applied to said sheet material in a direction substantially normal thereto by moving said members rapidly toward one another; and venting air from said recess to the exterior while so applying said force.

2. A method of impact forming plastic sheet material into an integral, configurated element having a relatively narrow projection of concavo-convex cross-section including the steps of:

positioning such sheet material at a substantially ambient temperature between a die member having a projection-forming recess in its sheet-engaging surface, said recess having a relatively narrow width in relation to its depth, and a back-up member having a substantially flat sheet-engaging surface;

striking said sheet material at said substantially ambient temperature with said members with a high impact, compressive force to free form the projection within said projection-forming recess during said striking, the corners of said recess at the junctions of the side walls thereof with the adjacent portions of the sheet-engaging surface of said die member establishing only the location of said projection and its maximum lateral extent, said recess being sufficiently deep to afford a void space between said projection and the walls of said recess; and venting said recess to the exterior at a controlled rate during said striking.

3. A method of impact forming plastic sheet material into an integral, configurated element having a projection of relatively narrow cross-section including the steps of:

positioning said sheet material between a die member having a projection-forming recess in its sheet-engaging surface of relatively narrow width in relation to its depth, and a back-up member with a substantially flat sheet-engaging surface;

striking said sheet material with said members with a high impact, compressive force of large magnitude to free form the projections within said projection-forming recess, the recess establishing only the location and maximum lateral extent of the projection, said striking force being applied to said sheet material in a direction normal thereto by moving said members rapidly toward one another; and venting air from said recess to the exterior while still applying said force.

References Cited

UNITED STATES PATENTS

| | | | |
|---|---|---|---|
| 893,739 | 7/1908 | Latham | 264—320 |
| 2,953,816 | 9/1960 | Kidder | 18—55 |
| 3,074,115 | 1/1963 | Albrecht | 18—55 |
| 3,234,771 | 2/1966 | Fehling | 72—256 |
| 3,342,915 | 9/1967 | Wanderer | 264—92 |

ROBERT F. WHITE, *Primary Examiner.*

R. R. KUCIA, *Assistant Examiner.*